United States Patent [19]

Lind et al.

[11] Patent Number: 5,070,140

[45] Date of Patent: Dec. 3, 1991

[54] COPOLYMERS OF VINYL ACETATE AND ALLYL GLYCIDYL ETHER CAPPED $C_{12}$-$C_{30}$ ALIPHATIC ALCOHOLS AND THEIR SAPONIFIED PRODUCTS

[75] Inventors: Eric Lind, Canton; Pauls Davis, Gibraltar; Steven D. Gagnon, Detroit, all of Mich.

[73] Assignee: BASF Corporation, Wyandotte, Mich.

[21] Appl. No.: 455,716

[22] Filed: Dec. 22, 1989

[51] Int. Cl.[5] ...................... C08F 16/06; C08F 218/02

[52] U.S. Cl. ...................................... 525/60; 526/330

[58] Field of Search .......................... 526/330; 525/60

[56] References Cited

U.S. PATENT DOCUMENTS

| | | | |
|---|---|---|---|
| 3,052,610 | 9/1962 | Akaboshi et al. | 526/330 |
| 3,131,162 | 4/1964 | Sterling et al. | 526/330 |
| 3,247,151 | 4/1966 | Casey et al. | 526/330 |
| 3,673,168 | 6/1972 | Burke et al. . | |
| 3,850,861 | 11/1974 | Fabris et al. . | |
| 4,180,482 | 10/1988 | Krueger . | |
| 4,458,038 | 7/1984 | Ramlow et al. . | |
| 4,476,252 | 10/1984 | Esselborn et al. | 526/330 |
| 4,520,184 | 5/1985 | Van Eenam . | |
| 4,581,382 | 4/1986 | Liberti et al. . | |
| 4,708,999 | 11/1987 | Marten . | |
| 4,746,456 | 5/1988 | Kud et al. . | |
| 4,939,221 | 7/1990 | Gagnon et al. | 526/330 |

FOREIGN PATENT DOCUMENTS

| | | | |
|---|---|---|---|
| 695718 | 10/1964 | Canada | 526/330 |
| 0767131 | 9/1980 | U.S.S.R. | 526/330 |
| 581170 | 10/1946 | United Kingdom | 526/330 |
| 892106 | 3/1962 | United Kingdom | 526/330 |
| 1103947 | 2/1968 | United Kingdom | 526/330 |

*Primary Examiner*—Joseph L. Schofer
*Assistant Examiner*—N. Sarofim
*Attorney, Agent, or Firm*—William G. Conger

[57] ABSTRACT

A copolymer based on vinyl acetate and an allyl glycidyl ether capped $C_{12}$-$C_{30}$ aliphatic alcohol and their saponified products.

25 Claims, No Drawings

COPOLYMERS OF VINYL ACETATE AND ALLYL GLYCIDYL ETHER CAPPED $C_{12}$–$C_{30}$ ALIPHATIC ALCOHOLS AND THEIR SAPONIFIED PRODUCTS

FIELD OF THE INVENTION

This invention relates to copolymers based on vinyl acetate and allyl glycidyl ether capped $C_{12}$–$C_{30}$ aliphatic alcohols and their saponified products.

BACKGROUND OF THE INVENTION

Vinyl acetate is a relatively inexpensive material from which polymers may be produced. Heretofor, polymerization of vinyl acetate produced molecules of relatively high viscosity, and having low hydroxyl functionality. Such characteristics of polyvinyl acetate make it undesirable as a polyol, and more particularly undesirable for use in the production of urethanes. Further, vinyl acetate is a monomer with relatively low reactivity and thus the polymerization of such a monomer requires a great deal of heat or excess quantities of initiator.

Thus, polymers of vinyl acetate which have relatively low viscosity, have acceptable functionality, and require relatively low heat or acceptable amounts of initiator to produce would be advantageous as polyols, and more particularly for use in the production of urethanes.

SUMMARY OF THE INVENTION

The present invention provides copolymers based on vinyl acetate and allyl glycidyl ether capped $C_{12}$–$C_{30}$ aliphatic alcohols and their saponified products. Preferably, the vinyl acetate based copolymers have the general formula I and their saponified products have formula II:

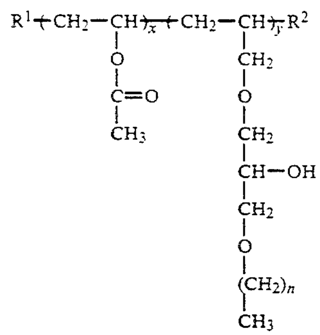

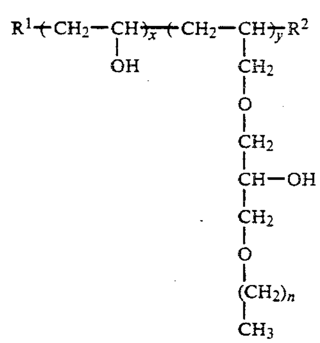

wherein $R^1$ and $R^2$ are each end groups, preferably hydroxyl or isopropoxyl groups, x is equal to or greater than y and n is a number ranging from about 11 to about 29.

The vinyl acetate based copolymers of the present invention have relatively low viscosity, have sufficient functionality for use as a polyol and more particularly for use in the production of urethanes, and are soluble in polyethers. It was surprisingly found that the vinyl acetate based copolymers of the present invention were biodegradable making them particularly suitable for use as a surfactant, as a component in packaging and other products requiring biodegradability.

DETAILED DESCRIPTION OF THE INVENTION

The invention provides copolymers of polyvinyl acetate/allyl glycidyl ether (PVAC/AGE) capped $C_{12}$–$C_{30}$ aliphatic alcohols and their saponified products, being polyvinyl alcohol/allyl glycidyl ether (PVA/AGE) capped $C_{12}$–$C_{30}$ aliphatic alcohols. The AGE capped aliphatic alcohols have the general formula III:

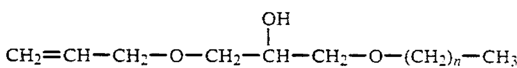

The present invention provides copolymers based on vinyl acetate and allyl glycidyl ether capped $C_{12}$–$C_{30}$ aliphatic alcohols and their saponififed products. Preferably, the vinyl acetate based copolymers have the general formula I and their saponified products have formula II:

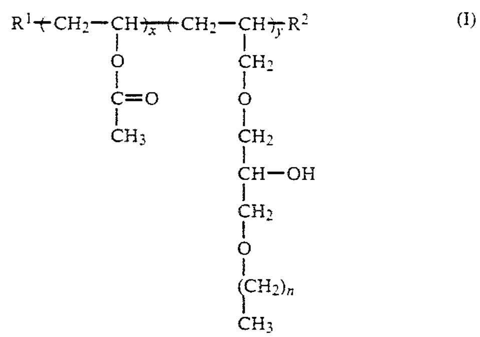

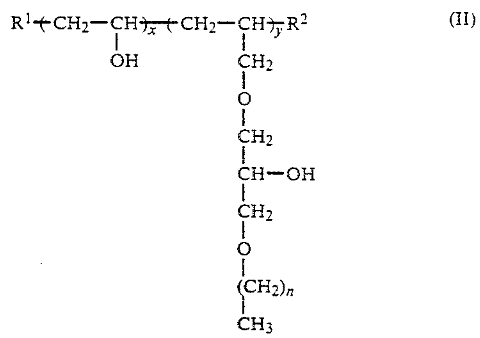

wherein $R^1$ and $R^2$ are each end groups, x is equal to or greater than y and n is a number ranging from about 11 to about 29.

In another embodiment, the copolymers based on vinyl acetate and allyl glycidyl ether capped $C_{12}$–$C_{30}$ aliphatic alcohols include a vinyl alcohol group. The vinyl alcohol group may be present in amounts ranging from trace quantities to about five mole percent. Such copolymers preferably have the formula:

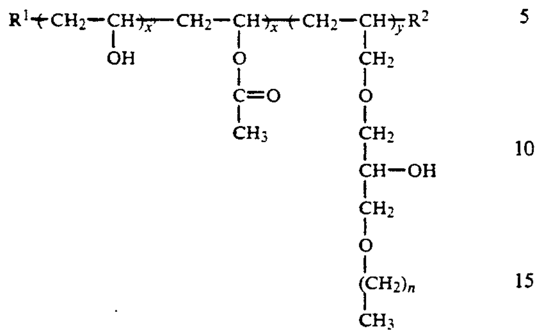

wherein $R^1$ and $R^2$ are each end groups, preferably hydroxyl or isopropoxyl groups, x is equal to or greater than y and n is a number ranging from about 11 to about 29 and x' ranges from trace quantities to about five mole percent.

In another embodiment, the copolymers based on the saponified product of vinyl acetate and allyl glycidyl ether capped $C_{12}$–$C_{30}$ aliphatic alcohols include a vinyl acetate group. The vinyl acetate group may be present in an amount ranging from trace quantities to about five mole percent. Such copolymers preferably have the formula:

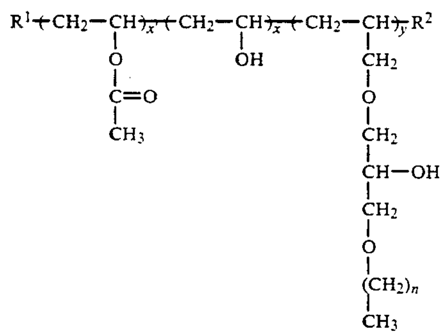

wherein $R^1$ and $R^2$ are each end groups, preferably hydroxyl or isopropoxyl groups, y is equal to or greater than y and n is a number ranging from about 11 to about 29 and x' ranges from trace quantities to about five mole percent.

The copolymer has an number average molecular weight (GPC MWn) ranging from about 500 to about 5000, and more preferably, from about 500 to about 2000.

The copolymer has a viscosity ranging from about 500 to about 100,000 cP and preferably from about 500 to about 20,000 cP@25° C. The allyl glycidyl ether capped $C_{12}$–$C_{30}$ monomer may be synthesized by a variety of methods, one of which is discussed in greater detail hereafter.

More preferably, the vinyl acetate based copolymer have the formula I and the saponified products have the formula II:

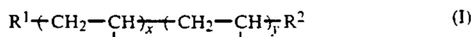

(I)

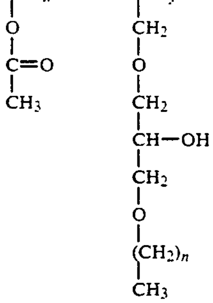

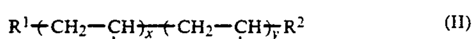

(II)

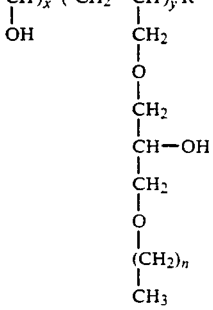

wherein, as is the case for all of the above formulas, $R^1$ and $R^2$ are end groups, preferably each being selected from the group consisting of hydroxyl or isopropoxyl, x is 50–9.999 mole percent and y is 0.001–50 mole percent; preferably x is 75–99.995 mole percent and y is 0.005–25 mole percent, and most preferably x is 85–99.995 mole percent and y is 0.005–15 percent and n is a number ranging from about 11 to about 29.

Suitable initiators for the copolymerization included alcohols, more preferably hydrogen peroxide and isopropanol.

The copolymer may be blended with a hydroxyl-group containing component such as polyethers or polyesters and the like wherein the copolymer is present in about 2 to about 99 weight percent and preferably from about 2 to about 20 weight percent such that the copolymer is uniformly dispersed in the compound. Examples of the hydroxyl group containing component include aliphatic glycols, dihydroxy aromatics, bisphenols, hydroxyl terminated polyethers, polyesters and polyacetals.

Preferably, the vinyl acetate based copolymer is prepared by the free radical process using a continuous process tubular reactor system. U.S. Pat. No. 3,673,168 discloses a tubular reactor and continuous process for producing polymeric materials which are suitable for use in producing the vinyl acetate based copolymer of the present invention. U.S. Pat. No. 3,673,168 is hereby incorporated by reference.

The copolymers of this invention were prepared by a free radical process using a continuous process tubular reactor system. The monomer mix consisting of vinyl acetate, an AGE capped $C_{12}$–$C_{30}$ aliphatic alcohol, hydrogen peroxide (other initiators could be used) and a solvent (usually an alcohol but could be an ester or a ketone) are added to a cooled feed tank equipped with a mechanical stirrer. Nitrogen can be bubbled through the monomers mix. The monomer mix is continually fed by gravity into a high pressure diaphragm pump which in turn pumps the monomer mix at high pressure 450 psig, with a flow rate of 300–1500 mL/hr, into a stainless steel tubular reactor (ca. 600 mL capacity). The tubular reactor coil is submerged in hot (150° C.) silicone oil. The contact time in the coil depends on the pumping rate. The reacted monomer mix exits the tubular reactor and is collected in a cooled vessel. As an alternative to the above procedure, the hydrogen peroxide can be pumped separately into the system at a point just before entering the heated coil where it will mix with the monomers that are pumped into the tubular reactor from the feeder tank. This prevents partial polymerization of reactive monomers from occurring in the feeder tank which can occur when larger amounts of hydrogen peroxide are present.

The crude products are neutralized to pH=7, dried, and stripped of volatiles to obtain conversion. The crude product was used directly when saponification was intended. This was accomplished by using a NaOH aqueous ethanol solution.

The following Example I illustrates a preferred method of producing an AGE capped $C_{12}$–$C_{30}$ aliphatic alcohol.

EXAMPLE I

Molten dodecanol (2232 g) and potassium t-butoxide (19 g) were charged to a clean dry 2 gallon reactor. This was purged three times with nitrogen and pressure checked. The reactor was heated to 110° C. and AGE (1506 g) was added over 2 hrs. The reaction mixture was heated to 135° C. for 8 hours. The temperature was lowered to 105° C. and evacuated to 60 mmHg. The reactor was cooled and the crude product discharged. This was treated with 3% magnesol at 95° C. then filtered until clear. The resulting solution was stripped at 100° C. and 10 mm Hg for one hour to give 3456 g of product. The GPC MWn=386 g/m. OH#=182, acid#=0.004, ALK as PPM K=9.8, unsaturation=3.45 meq/g polyol.

The following example II illustrates a preferred method making PVAC/AGE capped dodecanol.

EXAMPLE II

Monomer mix consisting of vinyl acetate (450 g), AGE capped dodecanol prepared in accordance with Example I, (150 g), isopropanol (340 g), and 50% hydrogen peroxide (70 g) were combined and added to the stirred water cooled feeder vessel of the tubular reactor. The monomer mix was gravity fed into the high pressure diaphragm pump which in turn pumped the monomer mix at 450 psi and a rate of 1,000 mL/hr into the heated (155° C.) stainless steel coil (about 40 min. residence time). The slightly viscous yellow product exited from the tubular reactor into a collecting vessel. The solution was taken down on a rotary evaporator and for final removal of volatiles on a vacuum pump at 0.5 mmHg for 2 days while heating with steam. The pH of the crude product was 4.5 and the yield was 56%. The GPC MWn was 697 g/m, OH#=98.6, acid#=7.16, % $H_2O$=0.01, unsaturation=0.424, saponification#=390.6, viscosity@25° C.=16,500 cP.

The following Example III illustrates a preferred method of producing PVA/AGE capped dodecanol by saponifying PVAC/AGE capped dodecanol.

EXAMPLE III

In a 2 liter flask was added PVAC/AGE capped dodecanol prepared in accordance with Example II (153.25 g). To this was added 550 mL of 9% NaOH to form a solution. The solution was stirred and within 1 hour the solution had gone from yellow to red and a precipitate formed. The polymer was extracted with EtOAC and the EtOAC was evaporated off to give the desired product. IR $cm^{-1}$ 3380, 2920, 2860, 1115 major peaks.

The copolymers prepared in Examples II–III were soluble in polyethers and were suitable for use in preparing polyurethanes.

The copolymers of the present invention were tested for biodegradability by a 28 day Zahn-Wellens method. The Zahn-Wellens method measures Total Organic Carbon (TOC) disappearance of an aqueous solution containing 400 ppm of the copolymer sample with 1000 ppm of activated sludge. In this test, the pH solids level in the solution and the oxygen demand are monitored periodically. A PVAC/AGE capped dodecanol copolymer, prepared in accordance with examples I and II, was measured to have a 87% Total Organic Carbon (TOC) disappearance by the Zahn-Wellens 28 day test. A PVA/AGE capped dodecanol copolymer, prepared in accordance with examples I–III, was measured to have a 62% TOC disappearance by the Zahn-Wellens 28 day test.

Thus, the copolymers of the present invention surprisingly are biodegradable making them suitable as either surfactants, or as a component in packaging and other products requiring biodegradability.

We claim:

1. A copolymer having the general formula:

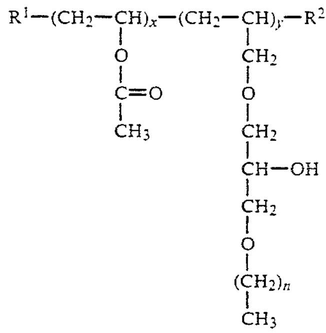

wherein $R^1$ and $R^2$ are end groups, and x is equal to or greater than y, and n is a number ranging from about 11 to about 29 wherein the molecular weight of said copolymer is from about 500 to about 5000.

2. A copolymer as set forth in claim 1 wherein X ranges from 50–99.999 mole percent and y ranges from 0.001–50 mole percent.

3. A copolymer as set forth in claim 1 wherein $R^1$ and $R^2$ are each OH.

4. A copolymer as set forth in claim 1 wherein $R^1$ and $R^2$ are each an isopropoxyl groups.

5. A copolymer as set forth in claim 1 wherein $R^1$ is OH and $R^2$ is an isopropoxyl group.

6. A copolymer as set forth in claim 1 wherein $R^1$ and $R^2$ are each selected from the group consisting of hydroxyl and isopropoxyl.

7. A copolymer as set forth in claim 1 wherein X is 75–99.995 mole percent and y is 0.005–25 mole percent.

8. A copolymer as set forth in claim 1 wherein x is 85–99.995 mole percent and y is 0.005–15 mole percent.

9. A copolymer comprising the reaction product of vinyl acetate and an allyl glycidyl ether capped $C_{12}$-$C_{30}$ aliphatic alcohol, wherein the molecular weight of said copolymer is from about 500 to about 5000.

10. A copolymer as set forth in claim 9 which is initiated by a material selected from the group consisting of hydrogen peroxide and isopropanol.

11. A copolymer as set forth in claim 9 having a number average molecular weight ranging from about 500 to about 2000.

12. A copolymer as set forth in claim 9 having a viscosity ranging from about 500 to about 100,000 cP.

13. A copolymer as set forth in claim 9 having a viscosity ranging from about 500 to about 20,000 cP.

14. A copolymer as set forth in claim 1 wherein said copolymer is saponified.

15. A copolymer as set forth in claim 9 wherein said copolymer is saponified.

16. A copolymer as set forth in claim 1 wherein said copolymer has a number average molecular weight ranging from about 500 to about 2,000.

17. A copolymer as set forth in claim 1 wherein said copolymer has a viscosity ranging from about 500 to about 100,000 cP.

18. A copolymer as set forth in claim 1 wherein said copolymer has a viscosity ranging from about 500 to about 20,000 cP.

19. A copolymer as set forth in claim 14 wherein said saponified copolymer has a number average molecular weight ranging from about 500 to about 2,000.

20. A copolymer as set forth in claim 14 wherein said saponified copolymer has a viscosity ranging from about to about 100,000 cP.

21. A copolymer as set forth in claim 14 wherein said saponified copolymer has a viscosity ranging from about to about 20,000 cP.

22. A copolymer as set forth in claim 15 wherein said saponified copolymer has a number average molecular weight ranging from about 500 to about 2,000.

23. A copolymer as set forth in claim 15 wherein saponified copolymer has a viscosity ranging from about 500 to about 100,000 cP.

24. A copolymer as set forth in claim 15 wherein said saponified copolymer has a viscosity ranging from about 500 to about 20,000 cP.

25. A copolymer as set forth in claim 1 further comprising a vinyl alcohol group present in an amount ranging from trace quantities to about five mole percent.

* * * * *

UNITED STATES PATENT AND TRADEMARK OFFICE
CERTIFICATE OF CORRECTION

PATENT NO. : 5,070,140

DATED : December 3, 1991

INVENTOR(S) : ERIC LIND, PAULS DAVIS, and STEVEN D. GAGNON

It is certified that error appears in the above-identified patent and that said Letters Patent is hereby corrected as shown below:

In the Claims

Claim 20, after the word "from," insert therefor, --500--.

Claim 21, after the word "from," insert therefor, --500--.

Signed and Sealed this

Twenty-seventh Day of April, 1993

*Attest:*

MICHAEL K. KIRK

*Attesting Officer* *Acting Commissioner of Patents and Trademarks*